(12) United States Patent
Kawano

(10) Patent No.: US 6,452,895 B1
(45) Date of Patent: Sep. 17, 2002

(54) OBJECTIVE LENS DRIVING DEVICE FOR OPTICAL DISK DRIVE APPARATUS

(75) Inventor: Noriyuki Kawano, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/558,147

(22) Filed: Apr. 26, 2000

(30) Foreign Application Priority Data

Apr. 27, 1999 (JP) ............................................ 11-120262

(51) Int. Cl.$^7$ ................................................. G11B 7/09
(52) U.S. Cl. ...................................... 369/244; 359/819
(58) Field of Search ........................... 369/244, 44.22, 369/112.22; 359/811, 813, 814, 819, 823

(56) References Cited

U.S. PATENT DOCUMENTS 5,724,337 A   3/1998  Kawano et al. ............. 369/244
5,877,904 A   3/1999  Kawano et al. ............. 359/824
6,084,834 A   7/2000  Kawano et al. ........... 369/44.14

FOREIGN PATENT DOCUMENTS

| JP | 62-245537 | 10/1987 |
| JP | 62-262236 | 11/1987 |
| JP | 62-262237 | 11/1987 |
| JP | 2713564   | 10/1997 |
| JP | 11-25484  | 1/1999  |

*Primary Examiner*—Brian E. Miller
(74) *Attorney, Agent, or Firm*—Oblon, Spivak, McClelland, Maier & Neustadt, P.C.

(57) ABSTRACT

In an objective lens driving device of a shaft sliding and rotating type in which a lens holder 23 for holding an objective lens 21 is rotated and slid, ceramics is applied to one of the support shaft 26 and the shaft receiving section 22 or both the support shaft 26 and the shaft receiving section 22.

10 Claims, 4 Drawing Sheets

OBJECTIVE LENS DRIVING DEVICE FOR OPTICAL DISK DRIVE APPARATUS

BACKGROUND OF THE INVENTION

The present invention relates to an objective lens driving device of an optical disk drive apparatus capable of optically reading information by projecting an optical spot onto a recording medium provided on an optical disk.

In a conventional objective lens driving device of a shaft sliding and rotating type, a lens holder for holding an objective lens, having a shaft receiving section at a position close to the center, is rotated and slid with respect to a support shaft fixed to an actuator base, and the support shaft is made of stainless steel and coated with resin of fluorine, and the shaft receiving section is made of aluminum. In this case, clearance is formed between the support shaft and the shaft receiving section. Therefore, the lens holder integrated with the shaft receiving section is tilted in an arbitrary direction according to the clearance between the support shaft and the shaft receiving section. As a result, aberration is caused in the laser beams which are incident on the objective lens and condensed onto the disk, which has a bad influence on the optical characteristic of the optical disk drive apparatus. If the clearance is reduced so as to decrease the tilting angle, it becomes difficult for the lens holder to move smoothly. If the support shaft and the shaft receiving section are extended without reducing the clearance, it becomes difficult to decrease the thickness of the objective lens driving device.

In order to solve the above problems, there is disclosed an objective lens driving device of a sliding and rotating type in JP-A-11-25484. Referring to FIG. 2, the objective lens driving device will be explained below. In FIG. 2, reference numeral 1 is an objective lens for irradiating laser beams on an optical disk, reference numeral 2 is a lens holder for holding the objective lens 1, having a shaft receiving section 2a at a position close to the center, reference numeral 3 is a focus coil for driving the lens holder 2 in the focusing direction, reference numeral 4 is a tracking coil for driving the lens holder 2 in the tracking direction, reference numeral 5 is a feeder wire for feeding a drive current to the tracking coil 4, reference numeral 6 is a magnetic yoke for forming a magnetic circuit, reference numeral 7 is a magnet, reference numeral 8 is a support shaft for supporting the lens holder 2 slidably and pivotally, reference numeral 9 is an actuator base, and reference numeral 10 is an auxiliary magnet arranged close to the shaft receiving section 2a.

The objective lens 1, focus coil 3 and tracking coil 4 are fixed to the lens holder 2, and these components compose a movable section.

The support shaft 8 is fixed onto the actuator base 9. The support shaft 8 supports the movable section by the shaft receiving section 2a arranged in the lens holder 2 in such a manner that the movable section can be rotated and slid with respect to the support shaft 8. The magnetic yoke 6 and magnet 7 compose a magnetic circuit. The movable section is driven in the rotating and the sliding direction with respect to the support shaft 8 by the electromagnetic force generated by the electric currents, which are respectively supplied to the focus coil 3 and the tracking coil 4, and the magnetic circuit. The auxiliary magnet 10 is fixed to the lens holder 2 and generates a magnetic attraction force with respect to the support shaft 8.

Referring to FIG. 3, operation of the above objective lens driving device will be explained as follows. In FIG. 3, reference numeral 11 is an optical disk, reference mark θ is a tilt angle formed between the lens holder 2 and the support shaft 8, and reference mark F is a magnetic attraction force of the auxiliary magnet 10 with respect to the support shaft 8. As shown in FIG. 3, magnetic attraction force F generated by the auxiliary magnet 10, which is fixed to the lens holder 2, with respect to the support shaft 8 acts in such a manner that the shaft receiving section 2a of the lens holder 2 comes into linear contact with the support shaft 8. Accordingly, the lens holder 2 rotates round and slides on the support shaft 8 while the shaft receiving section 2a of the lens holder 2 is coming into linear contact with the support shaft 8. Therefore, tilt angle θ created by the clearance formed between the shaft receiving section 2a and the support shaft 8 can be kept constant at all times. Accordingly, even if the clearance is formed between the support shaft 8 and the lens holder 2, the posture of the objective lens 1 can be kept constant at all times.

However, according to the prior art described above, the following problems may be encountered. Since the auxiliary magnet 10 is fixed to the lens holder 2 so that a relative angle formed between the support shaft 8 and the lens holder 2 can be kept by giving a pushing force to push the lens holder 2 in the direction perpendicular to the axial direction of the support shaft 8, it takes time and labor to assemble the device. Further, since the support shaft 8 and the shaft receiving section 2a are strongly contacted with each other by the pushing force, although the tilt angle can be decreased, there is a possibility that the lens holder 2 can not be moved smoothly.

SUMMARY OF THE INVENTION

The present invention has been accomplished to solve the above problems of the prior art.

The present invention provides an objective lens driving device of an optical disk drive apparatus of a shaft sliding and rotating type in which a lens holder for holding an objective lens is rotated and slid, in that ceramics is applied to one of a support shaft and shaft receiving section.

According to the above structure, the coefficient of friction of one of the support shaft and the shaft receiving section or the coefficients of friction of both the support shaft and the shaft receiving section can be reduced and further the accuracy of machining can be enhanced. Therefore, the clearance formed between the support shaft and the shaft receiving section can be reduced.

DETAILED DESCRIPTION OF THE PREFERRED EMBODIMENTS

Figure 1:
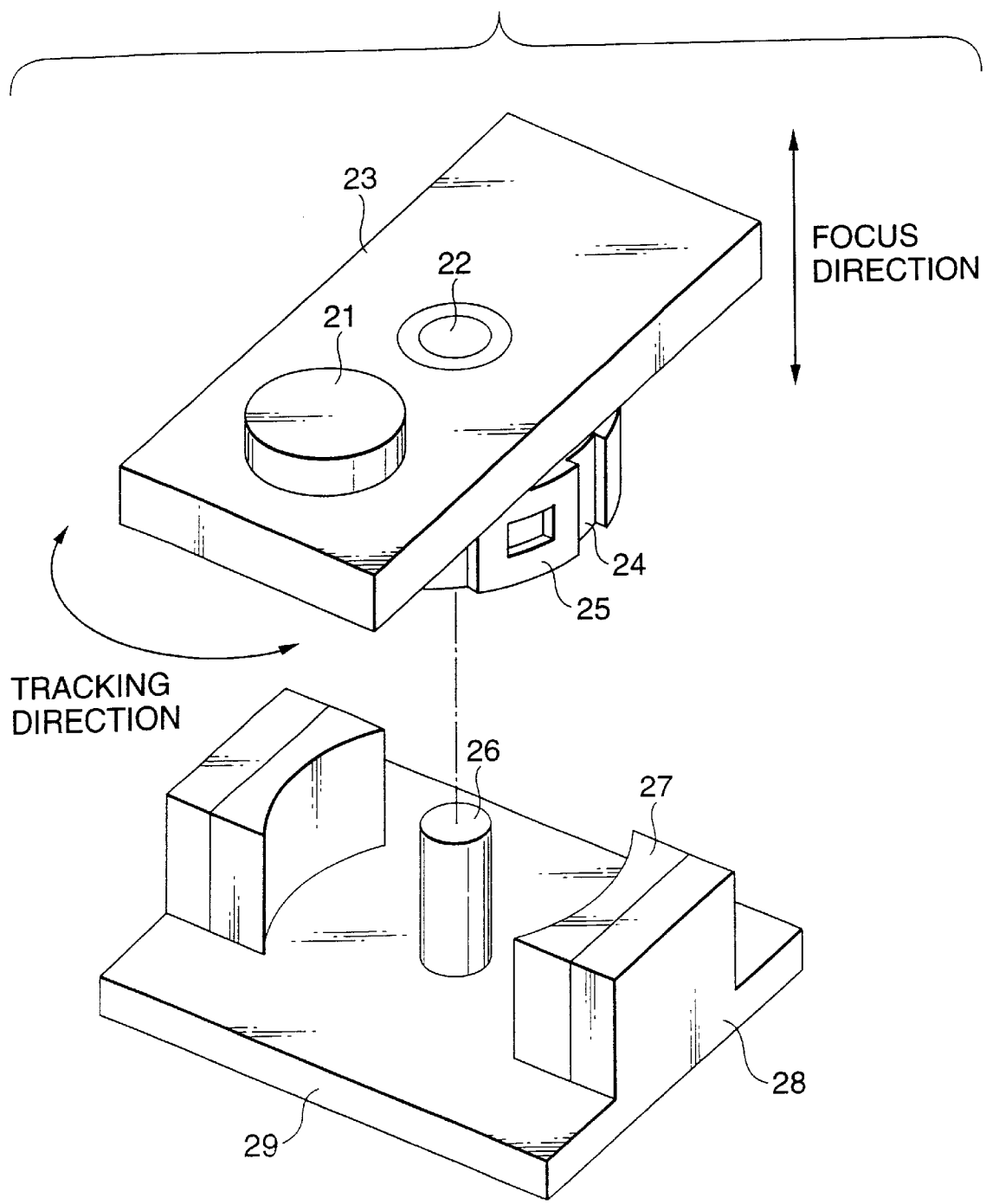
FIG. 1 is an exploded perspective view showing an embodiment of the present invention.
Figure 2:
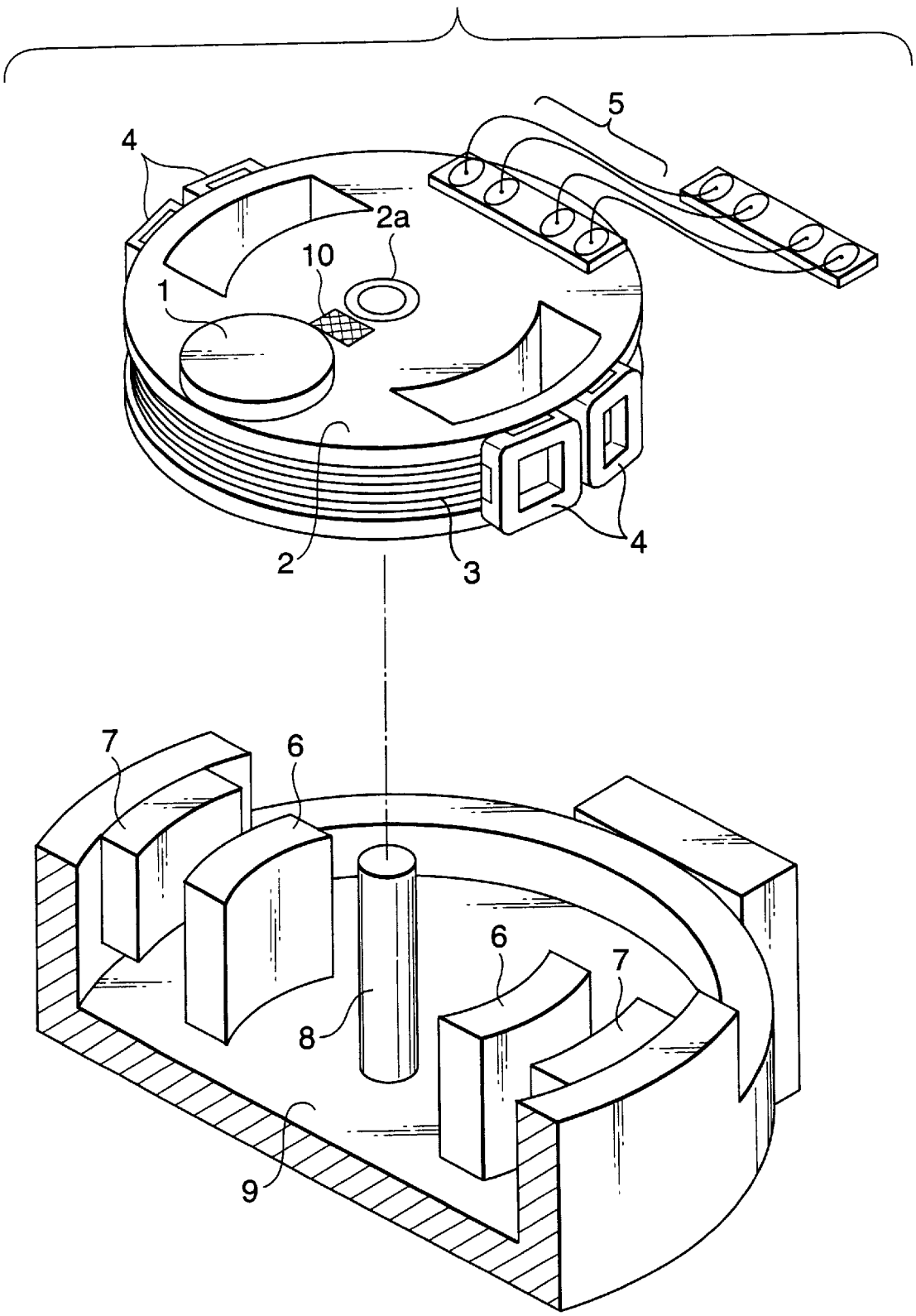
FIG. 2 is an exploded perspective view showing the prior art.
Figure 3:
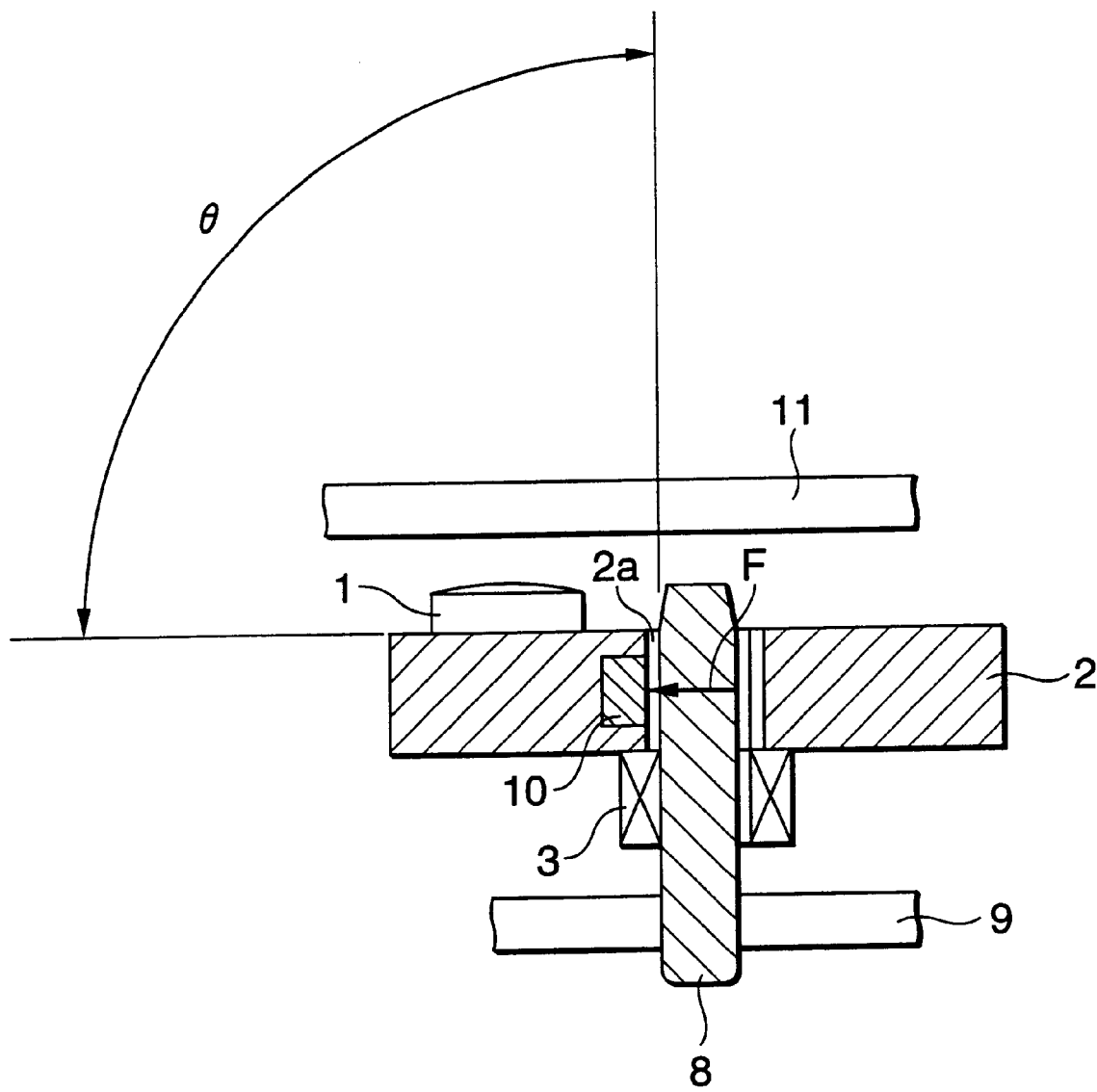
FIG. 3 is a partial cross-sectional view showing the prior art.

FIG. 1 is a view showing an embodiment of the present invention. In FIG. 1, reference numeral 22 is a shaft receiving section, and reference numeral 26 is a support shaft.

In the lens holder 23, there are provided an objective lens 21, shaft receiving section 22, focus coil 24 and tracking coil 25. On the actuator base 29, there are provided a support shaft 26, magnet 27 and yoke 28. In this connection, when the support shaft 26 is press-fitted into the actuator base 29, it can be strongly fixed onto the actuator base 29 with high accuracy. The lens holder 23 is arranged so that the support shaft 26 can be inserted into the shaft receiving section 22 fixed to the lens holder 23 leaving an appropriate clearance between the support shaft 26 and the shaft receiving section 22, and the lens holder 23 can be moved in the axial direction and the rotary direction of the support shaft 26. Also, the lens holder 23 is held at a neutral position with respect to the actuator base 29 in the focus direction and the tracking direction by an elastic member not shown in the drawing. When an electric current flows in the focus coil 24, a force is generated in the focus direction, so that the lens holder 23 can be moved from the neutral position to the focus direction. In the same manner, when an electric current flows in the tracking coil 25, a force is generated in the tracking direction, so that the lens holder 23 can be moved from the neutral position to the tracking direction.

Ceramics, the principal component of which is zirconia or alumina, is used for one of the support shaft 26 and the shaft receiving section 22. In this case, as the other of the support shaft 26 and the shaft receiving section 22, an aluminum shaft receiving or a stainless steel coated with fluorine resin is used. The coefficient of friction of ceramics, the principal component of which is zirconia or alumina, is lower than that of aluminum or stainless steel. Further, the accuracy of machining of ceramics, the principal component of which is zirconia or alumina, can be enhanced. Therefore, the dimensional accuracy can be enhanced. When aluminum and stainless steel are combined with each other in the conventional manner, the coefficients of friction of both aluminum and stainless steel are large, and further the accuracy of machining is low. Therefore, in order to ensure a smooth movement and rotation of the lens holder, it is necessary to set the clearance between the support shaft 26 and the shaft receiving section 22 at 15 to 25μ. However, according to the present invention, the clearance between the support shaft 26 and the shaft receiving section 22 can be set at 2 to 12μ which are lower than the above values.

Ceramics is applied to both the support shaft 26 and the shaft receiving section 22, for example, ceramics, the principal component of which is zirconia, or ceramics, the principal component of which is alumina, is applied to both the support shaft 26 and the shaft receiving section 22. In this case, the coefficient of thermal expansion of the support shaft 26 is equal to the coefficient of thermal expansion of the shaft receiving section 22. Therefore, the fluctuation of the clearance between the support shaft 26 and the shaft receiving section 22 caused by a change in temperature can be reduced. Therefore, this case is more advantageous than the case in which ceramics is applied to one of them from the viewpoint of temperature characteristic. Further, when ceramics is used for the support shaft 26, the rigidity of the support shaft 26 can be enhanced. Accordingly, the resonance frequency originated from the support shaft 26 can be set at a high value.

In any case, the clearance between the support shaft 26 and the shaft receiving section 22 can be reduced. Therefore, the tilt angle of the lens holder 23 caused by the clearance can be reduced. As a result, the aberration of laser beams, which are incident on the objective lens 21 and condensed onto the disk, can be reduced.

The structure of the present invention is different from that of the prior art as follows. In the lens holder 23 of the structure of the present invention, there is provided no auxiliary magnet for keeping a relative angle between the support shaft 26 and the lens holder 23 by giving a pushing force to push the lens holder 23 against the support shaft 26 in the direction substantially perpendicular to the axial direction of the support shaft 26. Therefore, according to the structure of the present invention, it is unnecessary to take time and labor when the device is assembled. Further, there is no possibility that the support shaft 26 and the shaft receiving section 22 are forcibly contacted with each other by a pushing force. Consequently, the lens holder 23 can be smoothly moved.

Figure 4:
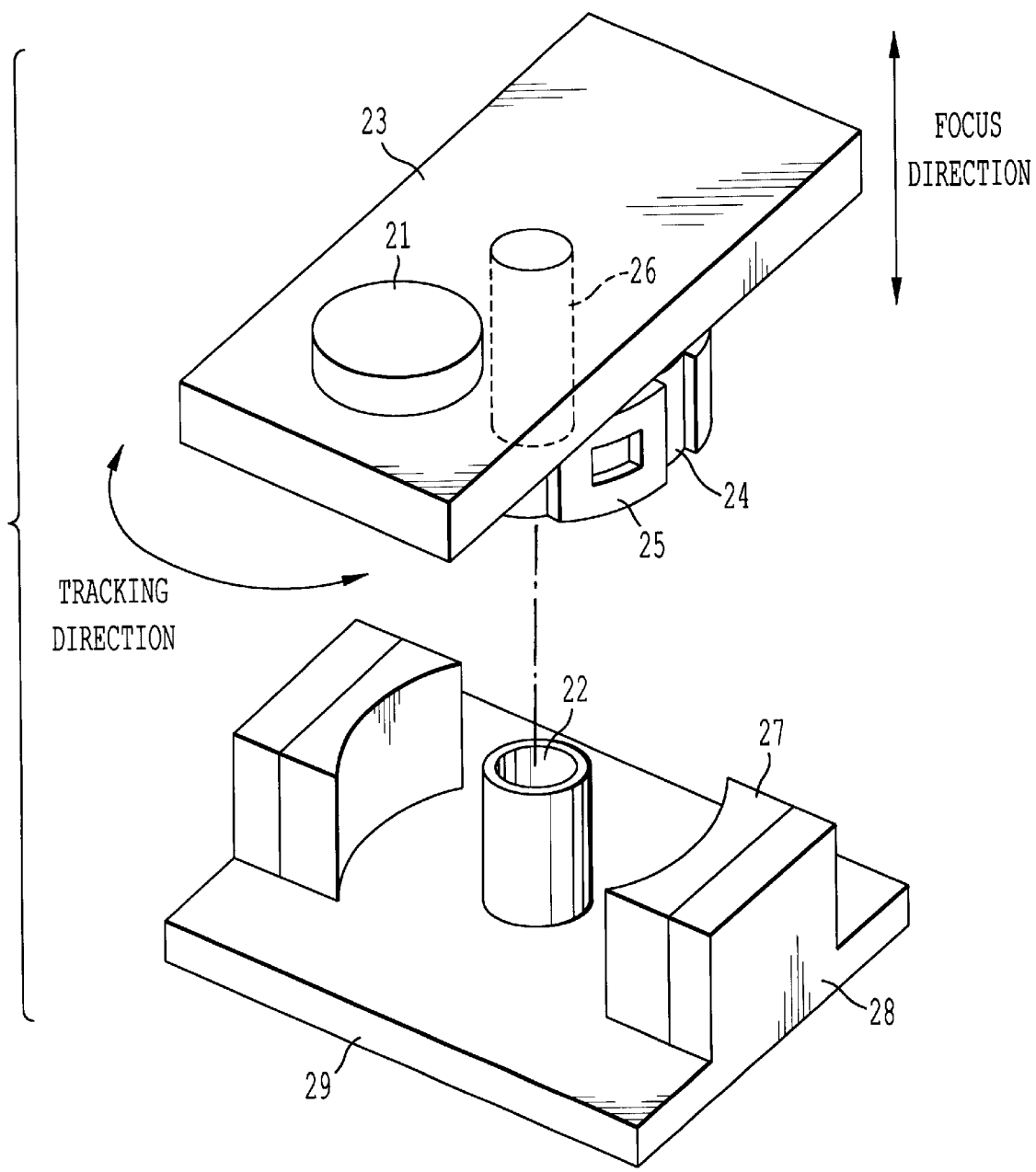
FIG. 4 is an exploded perspective view showing another embodiment of the present invention.

In the above structure, the shaft receiving section 22 is arranged in the lens holder 23, and the support shaft 26 is arranged on the actuator base 29. However, it is possible to provide the same effect when the support shaft 26 is arranged in the lens holder 23, and the shaft receiving section 22 is arranged on the actuator base 29. This alternative embodiment is shown in FIG. 4.

As explained above, according to the present invention, in the objective lens driving device of the shaft sliding and rotating type in which the lens holder for holding the objective lens is slid and rotated, ceramics is applied to one of the support shaft and the shaft receiving section, or ceramics is applied to both the support shaft and the shaft receiving section. Therefore, the coefficient of friction of one of the support shaft and the shaft receiving section can be decreased, or the coefficients of friction of both the support shaft and the shaft receiving section can be decreased, and further the accuracy of machining can be enhanced. Therefore, it is possible to reduce the clearance between the support shaft and the shaft receiving section. For the above reasons, it is unnecessary to provide parts for reducing the clearance between the support shaft and the shaft receiving section. Accordingly, it takes no time and labor to assemble the parts. Further, there is no possibility that the support shaft and the shaft receiving section are forcibly contacted with each other by a pushing force. Consequently, the lens holder can be smoothly moved.

What is claimed is:

1. An objective lens driving device of an optical disk drive apparatus of a shaft sliding and rotating type, comprising:

an actuator base;

a lens holder for holding an objective lens, which is rotatably and slidably mounted on said actuator base;

a support shaft formed on one of said actuator base and said lens holder; and a shaft receiving section for receiving said support shaft, which is formed in the other of said actuator base and said lens holder, wherein one of said support shaft and said shaft receiving section is made of ceramics and a clearance between said support shaft and the shaft receiving section is set at 2 to 12 microns.

2. An objective lens driving device of an optical disk drive apparatus according to claim 1, wherein the principal component of ceramics is zirconia.

3. An objective lens driving device of an optical disk drive apparatus according to claim 1, wherein the principal component of ceramics is alumina.

4. An objective lens driving device of an optical disk drive apparatus according to claim 1, wherein the shaft receiving section is formed in the lens holder, and the support shaft is arranged on an actuator base.

5. An objective lens driving device of an optical disk drive apparatus according to claim 1, wherein the support shaft is arranged in the lens holder, and the shaft receiving section is arranged on an actuator base.

6. An objective lens driving device of an optical disk drive apparatus of a shaft sliding and rotating type, comprising:

an actuator base;

a lens holder for holding an objective lens, which is rotatably and slidably mounted on said actuator base;

a support shaft formed on one of said actuator base and said lens holder; and a shaft receiving section for receiving said support shaft, which is formed in the other of said actuator base and said lens holder;

wherein both of said support shaft and said shaft receiving section are made of ceramics and a clearance between said support shaft and the shaft receiving section is set at 2 to 12 microns.

7. An objective lens driving device of an optical disk drive apparatus according to claim 6, wherein the principal component of ceramics is zirconia.

8. An objective lens driving device of an optical disk drive apparatus according to claim 6, wherein the principal component of ceramics is alumina.

9. An objective lens driving device of an optical disk drive apparatus according to claim 6, wherein the shaft receiving section is formed in the lens holder, and the support shaft is arranged on an actuator base.

10. An objective lens driving device of an optical disk drive apparatus according to claim 6, wherein the support shaft is arranged in the lens holder, and the shaft receiving section is arranged on an actuator base.

* * * * *